Patented Sept. 7, 1937

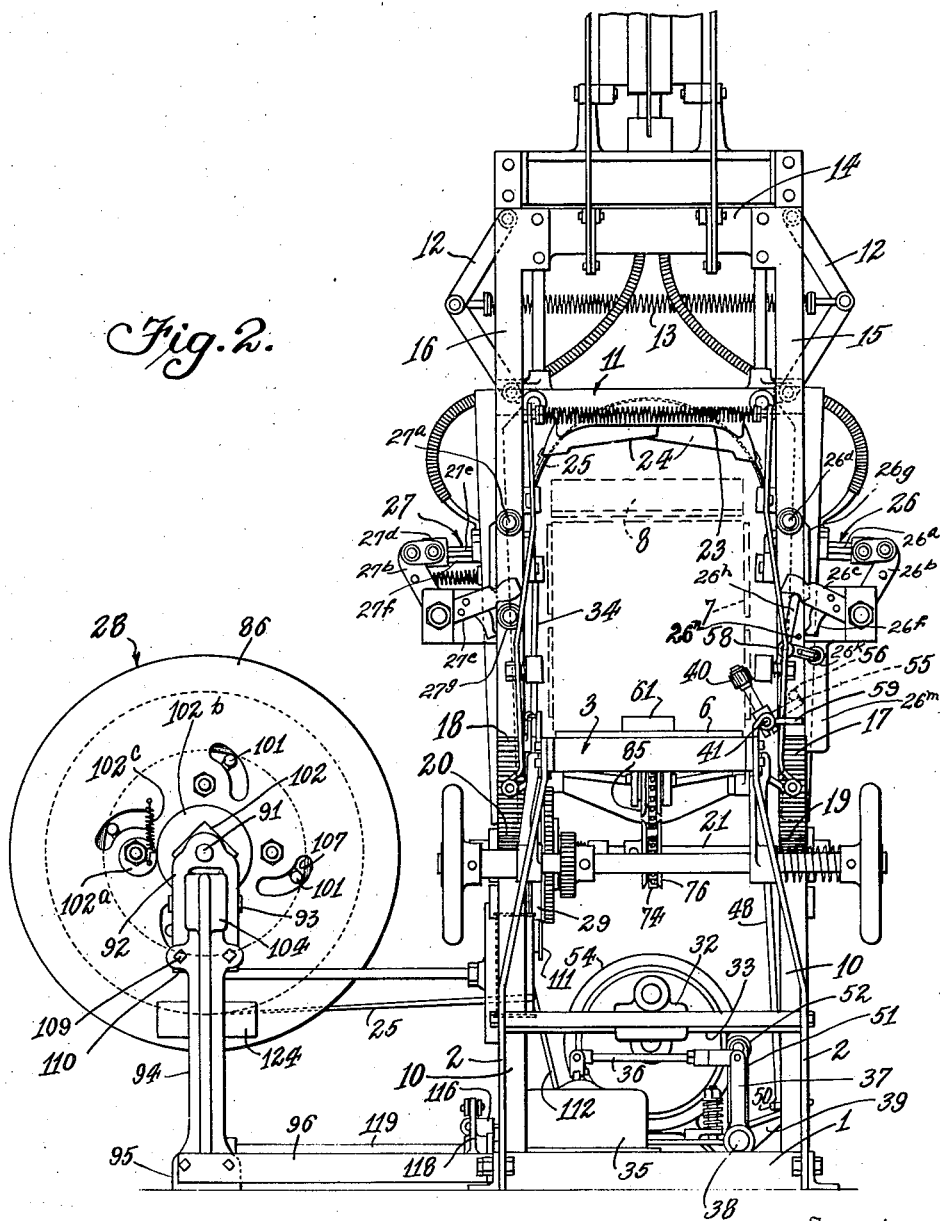

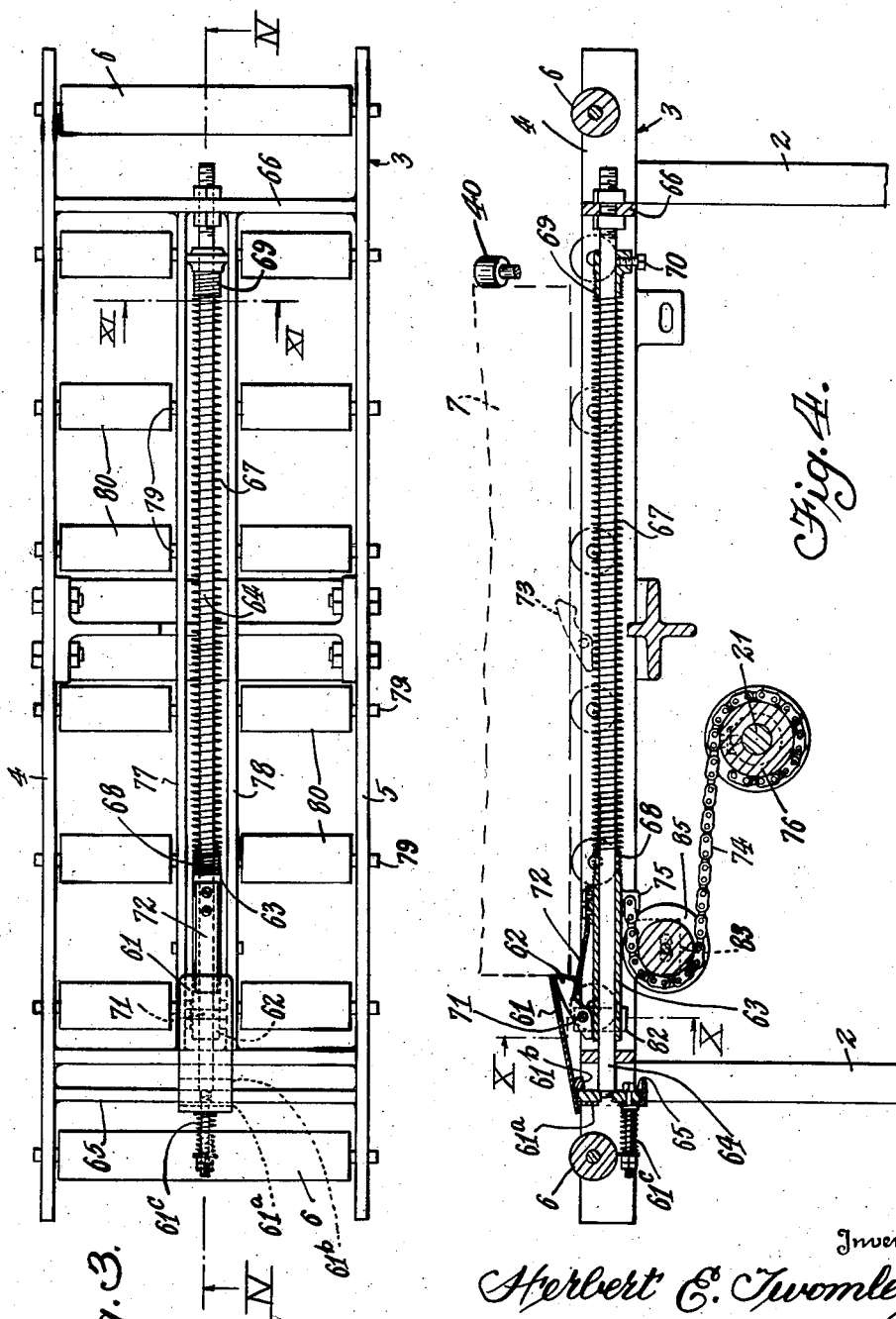

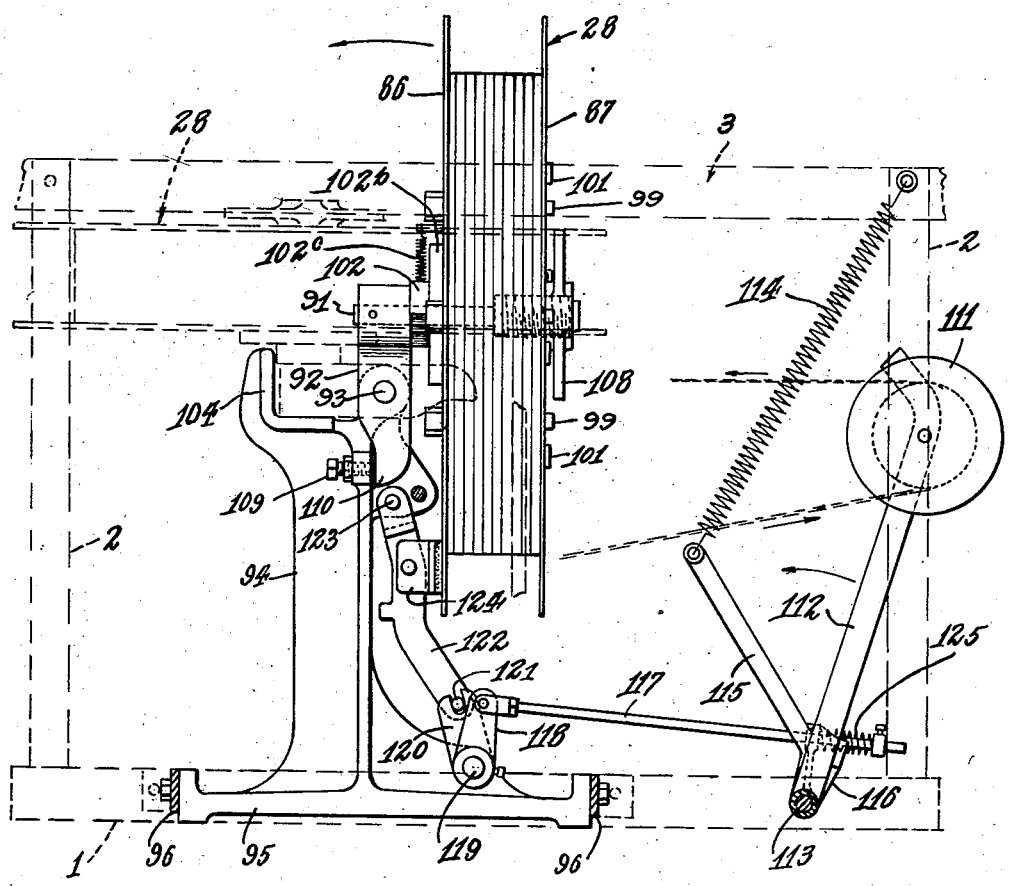

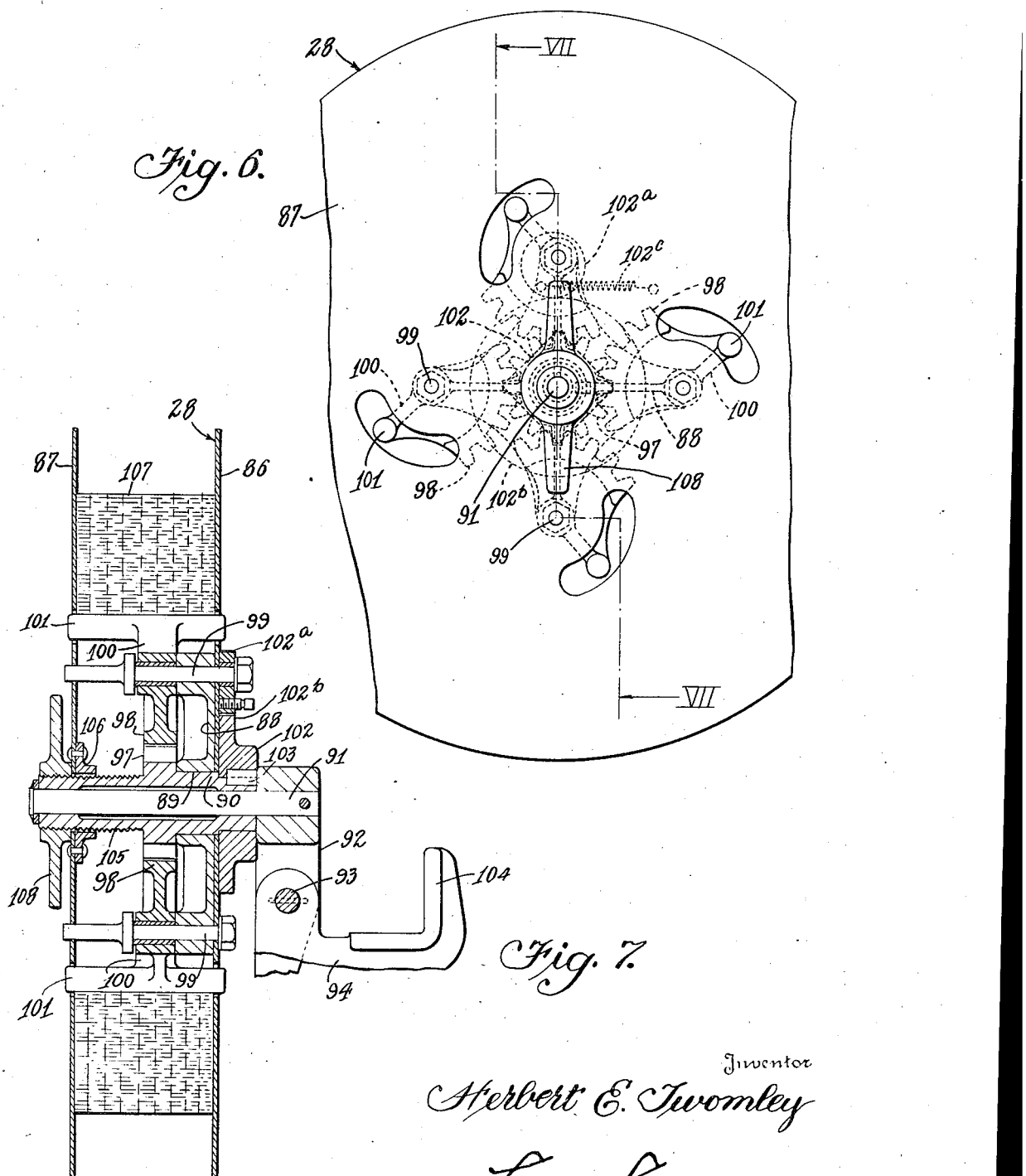

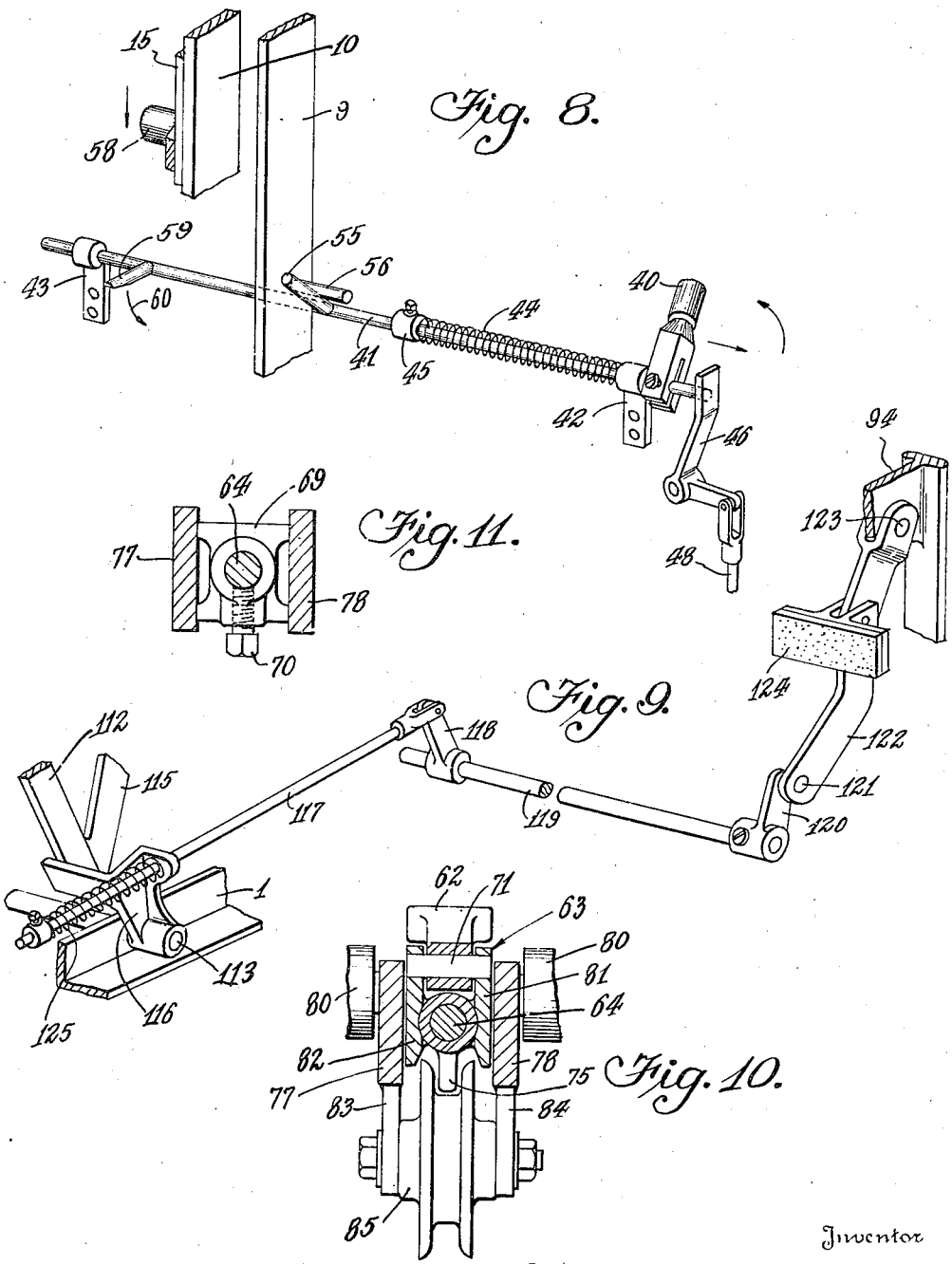

2,092,099

UNITED STATES PATENT OFFICE 2,092,099

STRAPPING MACHINE FOR BOXES

Herbert E. Twomley, Riverside, Calif., assignor, by mesne assignments, to Acme Steel Company, Chicago, Ill., a corporation of Illinois Application February 1, 1935, Serial No. 4,499

7 Claims. (Cl. 1—10)

My invention relates to strapping machines for boxes, and has particular reference to machines for applying straps across the covers of packed boxes to hold the covers in tight relation upon the boxes.

In the art of packaging materials, and particularly in the fruit and vegetable industry, it is the common practice to fill a box or container with fruit or vegetables to a considerable distance above the top level of the sides of the box and then to apply a cover across such overfilled boxes by springing the ends of the cover down upon, and into contact with, the ends of the box, leaving a bulge in the cover to accommodate the protruding or overpacked fruits or vegetables.

In order to maintain the cover in tight relation upon the box during transportation and storage of the fruits or vegetables, it is necessary that a strap be applied across the cover of the box, preferably at the center thereof, to further compress the bulged cover down upon the protruding fruit, and to apply such compression thereto that the shrinkage of the fruits or vegetables during transportation and storage will be taken up by the receding of the cover toward the box, due to the compressive action of the strap upon the cover and fruit.

In my copending application, Serial No. 739,734, filed August 14, 1934, Band-strapping machine, I have disclosed a machine for applying straps of the character noted above across the centers of over-filled boxes, the machine being particularly adapted to apply straps in the form of lengths of flat banding material, supplied to the machine from a continuous length wound upon a reel from which a predetermined length of strap material is drawn, and one end of which is fastened to the box. The strap material is then drawn tightly across the cover of the box and the other end of the predetermined length of strap material is secured to the box, and then this length is severed from the continuous length of supply; after which the box is freed to move out of the machine.

It is, therefore, an object of my invention to provide an improvement for machines of the character set forth in my copending application Serial No. 739,734 by permitting the entry of the box into the banding machine for automatically starting the banding operations.

Another object of the invention is to provide a banding machine of the character set forth wherein a box placed in a predetermined position in said machine will automatically start the machine into operation to perform the complete cycle of banding operations.

Another object of the invention is to provide a machine of the character set forth, wherein a box, upon entering into strapping position upon the machine, will automatically start the power mechanism for the machine and release all brakes usually employed to hold the machine in stationary condition between banding operations.

Another object of the invention is to provide a machine of the character set forth with a box-ejecting mechanism which will be coordinated with the banding operations to supply a predetermined force to the box to eject the same from the machine as soon as the banding operation is completed.

Another object of the invention is to provide a box-ejecting mechanism for a machine of the character set forth, wherein the operation of the machine will store up energy necessary for the ejection of the box, which energy is released and made effective to move the box upon the release of the box by the pressing elements of the machine.

Another object of the invention is to provide a machine of the character set forth with an automatic braking mechanism which will prevent the unreeling of more than a predetermined amount of the banding material upon each operation of the banding machine.

Another object of the invention is to provide a machine of the character set forth with a band material-holding reel which may be readily adjusted to hold various quantities of band material supply, and which, when once adjusted to receive a predetermined supply will remain in said adjusted position until the entire supply of material is used therefrom.

Another object of the invention is to provide a reel for holding a supply of banding material of the character set forth, wherein the reel may be opened to receive a supply of band material and when closed will automatically adjust itself to the quantity of banding material supplied thereto.

Other objects and advantages will be apparent from a study of the following specifications, read in connection with the accompanying drawings, wherein Figure 1 is a side elevational view of a strap-banding machine embodying my invention;

Fig. 2 is an end elevational view, looking in the direction of the arrow shown in Fig. 1;

Fig. 3 is a top, plan view of the box-supporting table employed in the machine shown in Figs.

Figure 1:
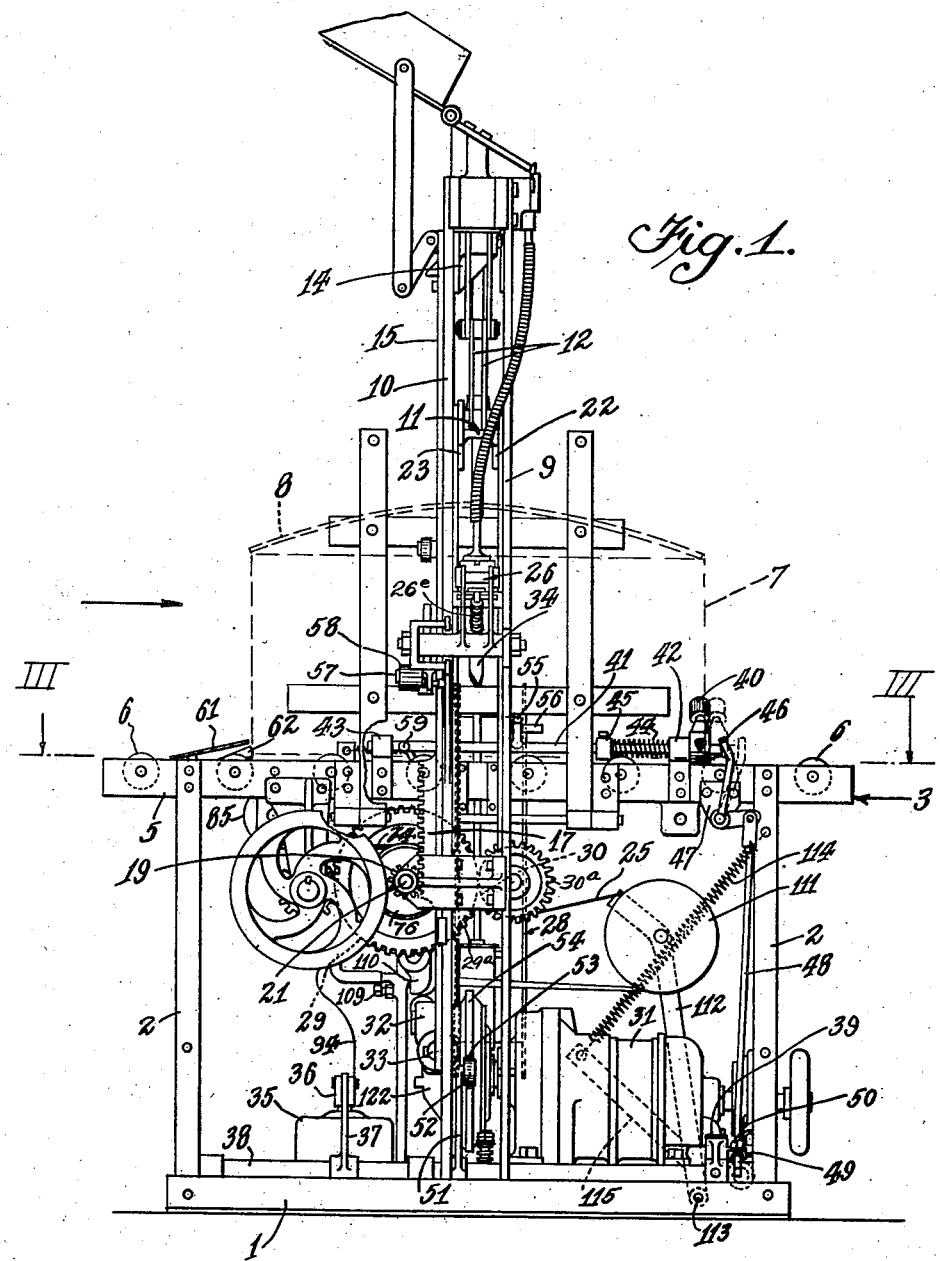

1 and 2, this view being taken along lines III—III of Fig. 1;

Fig. 4 is a detail, sectional view of the box-supporting table shown in Fig. 3, taken along line IV—IV of Fig. 3;

Fig. 5 is a detail, elevational view of the band-supporting reel shown in Fig. 2;

Fig. 6 is a detail view of the forward end of the reel shown in Fig. 5;

Fig. 7 is a sectional view, taken along line VII—VII of Fig. 6;

Fig. 8 is a diagrammatic view of the starting mechanism employed with the machine shown in Figs. 1 and 2;

Fig. 9 is a diagrammatic view of the connections employed for applying a brake to the band-supporting reel shown in Figs. 2, 5, 6 and 7;

Fig. 10 is a detail sectional view of the box-ejecting mechanism shown in Figs. 3 and 4, taken along line X—X of Fig. 4; and Fig. 11 is a detail sectional view of the box-ejecting mechanism shown in Figs. 3 and 4, taken along line XI—XI of Fig. 3.

Referring to the drawings, I have illustrated in Figs. 1 and 2 a band-strapping machine, the general construction and operation of which is illustrated and explained in detail in my copending application Serial No. 739,734, hereinbefore referred to, such machine comprising, generally, a suitable base frame 1 from which rises four uprights 2 constituting legs upon which a box-supporting table 3 is mounted in a horizontal position. The box-supporting table constitutes a section of roller conveyor and is constructed as shown particularly in Figs. 3 and 4 of a pair of side rails 4 and 5 spaced apart a distance somewhat in excess of the width of a box to be strapped upon my machine.

Extending across the space between the side rails 4 and 5 are a plurality of conveyor rollers 6 upon which a box 7 (see Figs. 1 and 2) may be readily moved into strapping position and then out of said machine.

The mechanism for applying a band of predetermined length of strap material across the centers of covers 8 of the box 7 is explained in detail in my copending application hereinbefore referred to, and as is illustrated herein this mechanism includes a pair of upright supports 9 and 10 on one side of the box-supporting table 3 at about the center thereof, while a similar pair of uprights is similarly located upon the opposite side of the nailing table 3 immediately behind the uprights 9 and 10 as viewed in Fig. 1, the upright 10 of which is seen upon the left-hand side of the machine, as viewed in Fig. 2. Slidably mounted upon the uprights 9 and 10 at opposite sides of the machine, is a press shoe 11 secured through toggle links 12 and spring 13 to a crosshead 14 suspended at the upper ends of a pair of vertically extending drive bars 15 and 16. The drive bars 15 and 16 are formed with gear racks 17 and 18, respectively, at their lower ends engageable with suitable pinions 19 and 20 mounted upon a drive shaft 21 extending across the machine below the box-supporting table 3 so that upon rotation of the drive shaft 21 in one direction the drive bars 15 and 16 are drawn downwardly to bring the press shoe 11 into pressing relation with the cover 8 of the box upon the supporting table 3 to thereby compress the center of the cover downwardly upon the overpacked fruit ready for the application of a strap thereto.

The press shoe 11 is formed of two spaced members 22 and 23, respectively, between which extends a strap guide 24 adapted to guide the end of a band or strap 25 across the cover of the box from the left-hand side of the machine, as viewed in Fig. 2, to a position along the right-hand side of the machine as viewed in that figure. The drive bars 15 and 16 are also adapted, upon their downward movement, to actuate nailing mechanisms 26 and 27 at opposite sides of the machine to first secure the right-hand end of the strap to the box and later to secure the left-hand end of the strap to the left-hand side of the box as the drive bars 15 and 16 continue their downward movement.

The band material employed in my machine is preferably in the form of a continuous roll of banding material wound upon or held upon a suitable supporting reel 28 and may be drawn from the reel as needed by feeding mechanism coordinated with the movements of the drive bars 15 and 16. This feeding mechanism includes a pair of feed rollers 29 and 30 spaced apart by such distance as will permit them to grip the band material between them, the roller 29 being formed integrally with the gear 29a mounted upon and rotatable with the drive shaft 21, while the other roller 30 is formed integrally with a gear 30a meshed with the gear 29a so that these rollers will rotate together at the same peripheral speed. The machine is equipped with suitable power mechanism for performing the operations thereof, comprising a motor 31 mounted upon the base 1 of the machine and connected through suitable crank connections 32 to a crosshead 33 interconnecting the lower ends of the drive bars 15 and 16 so that when the motor 31 is set into operation it will first draw the drive bars 15 and 16 downwardly from their elevated position as shown in Fig. 2 to their lowermost position.

Drawing the cross head 14 downwardly to bring the press shoe 11 into compressive relation with the center of a box resting upon the table 3 and continued operation of the motor will thereafter move the drive bars upwardly to restore the parts to the position shown in Figs. 1 and 2. It will be observed that during the return upward movement of the drive bars 15 and 16 the drive shaft 21 will be rotated in a predetermined direction and this direction is selected so that this upward movement of the drive bars 15 and 16 will be accompanied by a rotation of the feed rollers 29 and 30 in a direction necessary to draw a length of strap material from the reel 28 and feed the same upwardly through a suitable guide tube 34 and thence under the strap guide 24 to the right-hand side of the machine, as viewed in Fig. 2, to a position at which it will extend across a subsequent box placed in the machine. The strap thus fed into the machine is ready to be applied to a box. It will also be observed that upon the next operation of the motor 31 the drive bars 15 and 16 will be drawn downwardly to apply this length of strap to the box.

Nailing mechanisms 26 and 27 are arranged upon opposite sides of the machine, the nailing mechanism 26 including a nail driver 26a arranged to be driven horizontally by a bellcrank, of which one arm 26b connects with the nail driver 26 while the other arm 26c extends in the path of movement of a roller 26d secured to and movable with the drive bar 15. Also, the arm 26b has a spring 26e (see Fig. 1) attached thereto normally urging the driver 26a inwardly to drive a nail through the right-hand end of the strap material as viewed in Fig. 2, but the effect of this spring is restrained by a latch 26f engaging and holding the arm 26c of the bellcrank in its retracted position. A cam 26g on the drive bar 15, and located in advance of the position of the roller 26d, will engage the latch 26f upon the initial downward movement of the drive bar 15 to allow the spring 26e to move the driver 26a inwardly to start the nail through the right-hand end of the strap and into the side of the box 7. Also, the first part of the downward movement of the drive bars 15 and 16 will bring the press shoe 11 down to contact with the cover 8 of the box and compress the same, arching it over the center of the box.

About the same time that the nail is driven into the right-hand side of the box, as viewed in Fig. 2, the downward movement of the drive bars 15 and 16 will have rotated the shaft 21 in a direction opposite to that necessary to feed the strap material into the machine, and this reverse rotation will cause the rollers 29 and 30 to retract the strap (which is now secured at its free end to the box), drawing the strap taut across the compressed box cover. Further downward movement of the drive bars 15 and 16 will cause a roller 27a on the drive bar 16 to engage one arm 27b of a bellcrank of the nail driving mechanism 27, the other arm 27c connecting to a head 27d which carries a nail driver 27e and a cutter 27f and moves both the driver 27e and the cutter 27f toward the left-hand side of the box, as viewed in Fig. 2. The inward movement of the driver 27e drives a nail through the left-hand end of the length of strap which is now taut across the box, while the cutter cuts the strap immediately after the nail has been driven through the same. The roller 26d on the drive bar 15 will engage the bellcrank arm 26c at about the same time to complete the inward movement of the driver 26a to complete the driving of the nail on the right-hand side of the box. Continued operation of the motor 31 will then elevate the drive bars 15 and 16 to lift the press shoe 11 off of the cover of the box, to free the box for exit from the machine, while at the same time this upward movement of the drive bars 15 and 16 will feed a new length of strap across the guide 24 ready for the next box.

The upward movements of the drive bars 15 and 16 also retract the nail driving mechanisms 26 and 27, the nail driver 26 being engaged by an arm 26h of a bellcrank pivoted upon and carried by the drive bars 15, the other arm of the bellcrank having a friction roller 26k engaging a friction plate 26m mounted upon the upright support 10. Thus as the drive bar moves downwardly the bellcrank 26h will be swung out of the path of movement of the arm 26c but upon the upward return movement of the drive bar 15 the bellcrank 26h will be swung to the position shown in Fig. 2 to engage below the arm 26c to thereby retract the nail driver 26a. A stop pin 26n on the bar 15 limits the rotation of the bell crank 26h as is necessary for it to operate as described. The drive bar 16 is provided with a roller 27g spaced below the roller 26a and engageable with the arm 27c of the nailing mechanism 27 so that the upward movement of the drive bar 16 causes the roller 27g to lift the arm 27c and retract the nail driver 27e.

By referring particularly to Figs. 1, 2, and 8, it will be observed that the control for the starting and stopping of the motor 31 consists of a switch 35 mounted upon the base 1 of the machine, to be actuated by a link 36 connected to a crank-arm 37 mounted upon an oscillatable shaft 38 journaled upon the base of the machine and having a foot pedal 39 extending outwardly therefrom to permit the manual operation of the switch 35 if desired. However, since all of the operations of the machine subsequent to the pressure of the foot pedal 39 are to be accomplished automatically merely by holding the switch 35 closed the ease with which the machine may be operated and the speed with which boxes may be strapped in the machine may be considerably increased by automatically starting the motor 31 as soon as a box 7 has entered into strapping position upon the box-supporting table 3. For this purpose I have provided an automatic switch-operating mechanism to be actuated by the entry of the box 7 into proper position in the machine, which mechanism consists essentially in a box stop roller 40 mounted rigidly near the outer end of a stop rod 41 secured in a pair of bearing members 42 and 43 attached to the side rail 5 of the box-supporting table.

It will be noted that the bearing members 42 and 43 (Figs. 1 and 8) constitute bearings in which the stop rod 41 is mounted, not only for rotary movement to swing the roller 40 into the path of the incoming box 7 and then out of the path of the box 7, but also permits the rod 41 to slide longitudinally of the machine.

A compression spring 44 (Figs. 1 and 8) is illustrated as surrounding the stop rod 41 between the bearing member 42 and a collar 45 so that normally this spring 44 tends to hold the stop rod in its normal position, as shown in full lines in Fig. 1, but will permit the rod 41 to be pressed to the right to the dotted line position indicated in Fig. 1 when a box 7 engages and moves the stop roller 40 as the box 7 is drawn or shoved into strapping position on the box-supporting table 3. It will also be noted that the spring 44 is secured to both the collar 45 and the bearing 42 in such manner as to provide a slight torsion to the rod 41 normally urging the roller 40 toward the box-supporting table 3, and to such position as will insure that the roller 40 lies in the path of the incoming box 7, but which will permit the rod 41 to be swung in the direction of the arrow shown in Fig. 8 to move the roller 40 out of the path of the box 7 when the box is to be ejected from the machine at the completion of the strapping operations.

By providing the longitudinal movement of the rod 41, I may utilize the force of the incoming box 7 to control the switch 35 by mounting a bellcrank 46 upon a bearing member 47 attached to the rail 5 of the box-supporting table 3, one arm of the bellcrank 46 extending upwardly into the path of longitudinal movement of the outer end of the stop rod 41; the other arm of the bell-crank 46 having a link 48 extending therefrom through a lug 49 on the foot pedal 39 and provided with a nut 50 to engage the upper surface of the lug 49 whenever the bellcrank is swung in a clockwise direction, as viewed in Figs. 1 and 8.

It will be apparent, therefore, that when a box 7 is fed into the machine and passes along the box-supporting table 3 toward strapping position thereon, the end of the box 7 will engage the roller 40 and move the rod 41 toward the bellcrank 46, as viewed in Fig. 1, thus operating through the bellcrank 46 and foot pedal 39 to actuate the foot pedal in the same manner as though this foot pedal had been operated by the manual force of the operator of the machine. The actuation of the foot pedal 39 closes the switch 35 to start the motor 31 into operation, the shaft 38 being provided with a crank 51 having a roller 52 thereon engaging in a notch 53 on a disc 54 to which the crank connections 32 are coupled, so that as soon as the motor 31 has been initially set into operation the disc 54 will start rotating. Thereafter, any release of pressure upon the foot pedal 39 or upon the bell-crank 46 will not permit the motor 31 to stop until the disc 54 has operated through one complete revolution, representing one complete cycle of strapping operations of the machine. At the end of the cycle of operations, however,—that is after the crankpin 32 has been swung through one complete revolution to draw the drive bars 15 and 16 downwardly and then return them to their uppermost normal position,—the notch 53 will again be aligned with the roller 52 and will permit the shaft 38 to swing back into switch-opening position, permitting switch 35 to open and stopping the motor 31 in this position.

As was explained more in detail in my copending application hereinbefore referred to, the shaft 38 may also be provided with suitable brake-releasing mechanism which will release a brake from the motor 31 whenever the shaft 38 is rotated to start the motor, and which will again apply the brake when the shaft 38 is returned to switch-opening position.

It will be observed from an inspection of Figs. 1, 2, and 8 that the roller 40 is permitted to swing inwardly toward the box 7 only a limited distance due to the arrangement of a stop pin 55 extending at right angles to the stop rod 41 engaging a limit-pin 56 fixedly mounted upon the upright support 9. It will also be observed that the drive bar 15 is provided with an outwardly extending pin 57 upon which is mounted a roller 58 engageable with a release-pin 59 also extending at right angles to the rod 41 so that when the drive bars 15 and 16 arrive in their lowermost position (representing the position at which both ends of the strap have been nailed to the box), the roller 58 will engage the release-pin 59 and will rock the stop rod 41 in the direction of the arrow 60 shown in Fig. 8, thus swinging the roller 40 out of alignment with the end of the box 7. This action will permit the spring 44 to slide the stop rod 41 to the left, as viewed in Figs. 1 and 8 so that when the drive bar 15 again moves upwardly and releases pressure upon the release-pin 59, the roller 40 will engage the side of the box but will not return to its position over the end of the box. It will, however, be noted at this time that the disc 54 will prevent the shaft 38 from moving back to its switch-open position until the drive bars 15 and 16 have again been elevated to their normal uppermost position, and hence though the stop rod 41 may be retracted to the left, as viewed in Fig. 1, the machine will continue in operation until the end of the cycle of operations but the box will be released from the roller 40 ready for ejection from the machine when the press shoe 11 is elevated therefrom.

Since it is the movement of the box 7 into the strapping position which causes the actuation of the switch to start the operation of the machine, it is necessary that the box shall be prevented from retracting from its forward position when the roller 40 has been moved forwardly to switch-operating position. In order to prevent the rearward movement of the box from this position, I provide a rear box stop to engage the rear end of the box when the box has been moved into strapping position in the machine. This rear stop is illustrated particularly in Figs. 1, 3, and 4 as comprising a plate 61 having an angle 61a secured at the rear end thereof, adapted to extend downwardly along the outer side of the cross members 65 at the end of the box supporting table 3. Spaced inwardly from the angle 61a is a block 61b engaging the front edge of the cross member 65 so that the angle 61a and the block 61b constitute a pivotal bearing upon which the plate 61 may pivot from an elevated position, as shown in Figs. 1 and 3, to a position below the level of the rollers 6 as the box slides onto the supporting table 3 and permitting the plate 61 to swing upwardly again to its normal position when the rear end of the box has passed beyond the plate 61. A suitable spring 61c may be employed to normally press the angle 61a tightly against the cross members 65 to normally urge the plate 61 to its elevated position.

With the release of the box stop roller 40 from the end of the box 7, and with the release of pressure of the press shoe 11 from the top of the box, the box may be readily ejected from the machine by any suitable box-ejecting mechanism, one form of which I have illustrated herein, particularly in Figs. 3 and 4, as comprising a dog 62 mounted upon a carriage 63 slidably supported upon a bearing rod 64 extending longitudinally of the table 3 and suitably supported in the end cross members 65 and 66 constituting cross braces between the rails 4 and 5 of the table 3. The carriage 63 is normally urged in the direction of movement of boxes over the supporting table 3 by means of a tension spring 67, one end of which is secured at 68 to the carriage 63, while the other end is secured to an adjustable collar 69 adjustably secured as by means of a screw 70 to the rod 64. The dog 62 is pivoted upon the carriage 63, as indicated at 71, so that it may be swung downwardly to a position below the bottom of the box when the box is moved into position on the supporting table 3, but is normally urged to its extended position as shown in Figs. 3 and 4 by means of a flat spring 72.

I prefer to employ the moving parts of the strapping elements of the machine to draw the dog 62 rearwardly of the box 7 to stretch the spring 67 and engage the dog 62 with the rear end of the box 7. With this arrangement, release of the roller 40 and release of pressure by the press shoe 11, will allow the tensioned spring 67 to forcibly eject the box from the machine. The spring 67 is preferably of such length that when fully contracted it will hold the dog 62 in the position indicated by dotted lines 73 and will be drawn from this position back to the full line position as shown in Fig. 3 by means of a chain 74 connected to a downwardly extending lug 75 on the carriage 63, the opposite end of the chain 74 being connected to a spool 76 rigidly mounted upon the drive shaft 21. Thus when the drive shaft 21 is rotated in a clockwise direction during the descent of the press shoe 11, drive bars 15 and 16, the chain 74 will be wound up upon the spool 76 and will retract the carriage 63 to position the dog 62 at the rear of the box 7. At the time that the roller 40 is moved away from the forward end of the box, the shaft 21 will be starting its reverse rotation, tending to slacken the chain 74. Also, immediately subsequent to the removal of the roller 40 from the front end of the box, the drive bars 15 and 16 will start toward their elevated position and will raise the press shoe 11 out of contact with the cover of the box. Thus the spring 67 will be free to force the carriage 63 along the rod 64 and the box will be ejected from the machine.

It will be understood by those skilled in this art that the reverse rotation of the shaft 21 under control of the cross head 33, is much more rapid and in advance of the time when spring 67 is effective to move the box so that little or no resistance will be offered by the chain 74 to the movement of the carriage 63, the effect being that the carriage 63 will be "snapped" from the position shown in full lines in Fig. 4 to the position shown in dotted lines in this figure.

From an inspection of Figs. 3 and 4, it will be observed that in addition to the outer rails 4 and 5 of the box-supporting table I provide a pair of inner rails 77 and 78 extending in parallel relation to each other and to the outer rails 4 and 5, these inner rails being employed to journal one end of the short shafts 79, upon which the intermediate rollers 80 of the box-supporting table are mounted, the opposite ends of each of these shafts or axles being mounted in the outer rails in the same manner as illustrated for the rollers 6. The space between the inner rails 77 and 78 may be employed as a guide track along which the carriage 63 may slide, as is indicated particularly in Fig. 10, the carriage 63 having a pair of parallel flanges 81 and 82 thereon spaced from each other by a distance slightly less than the spacing between the inner rails 77 and 78. Thus the carriage 63 will be prevented from tilting during its movement along the rod 64. The inner rails 77 and 78 are also employed as a mounting means for the bearing members 83 and 84 in which a guide roller 85 may be mounted, the chain 74 passing over the guide roller 85 in such direction that clockwise rotation of the shaft 21 will cause a retraction of the carriage 63.

In connection with band-strapping machines, wherein the band material is to be drawn from a continuous supply or roll of band material, it is necessary that the roll of band material be mounted upon a rotatable reel or spool. In view of the fact that the band material is relatively heavy and that a reel of such band material has great inertia, difficulty has been encountered first in starting the reel into movement as the predetermined length of the strap material is drawn therefrom, and what is more difficult, to stop the reel after the predetermined length has been drawn from the reel.

A portion of this difficulty may be overcome by the employment of an idler takeup mechanism illustrated and described in my copending application hereinbefore referred to. However, I find that the difficulty may be entirely overcome by employing a reel and braking mechanism as illustrated particularly in Figs. 2, 5, 6, 7 and 9 herein.

By referring particularly to Figs. 2, 5, 6, and 7, it will be observed that the reel 28 may be constructed of a pair of discs 86 and 87, the disc 86 being rigidly mounted upon a spider 88 rotatable upon a bearing 89 formed upon a hub 90 which is in turn rotatably mounted upon a stub shaft 91 fixed in a bearing block 92 pivoted as at 93 in a supporting frame 94. The supporting frame 94 is provided with a base 95 adapted to rest upon the floor of the packing house or shop wherein the machine is located and is connected to the base 1 of the machine by suitable straps 96 attached to the base 1 of the machine and the base 95 of the supporting frame or standard 94.

The hub 90 has a pinion 97 formed upon its inner end adapted to engage a plurality of segmental gears 98, the segmental gears being pivoted upon short shafts 99 secured to the spider 88, each of the segmental gears being provided with an outwardly extending arm 100 having a pin 101 extending at right angles thereto. Thus if the spider 88 is rotated relative to the hub 90, the pinion will rotate each of the segmental gears, swinging the pins 101 about their pivot shafts 99. From an inspection of Figs. 6 and 7 it will be observed that such relative movement between the spider 88 and the hub 90 will cause all of the pins to be simultaneously drawn inwardly toward the axis of rotation of the reel 28 or will cause all of the pins 101 to be moved outwardly away from the axis of rotation of the reel. I prefer to employ this movement of the pins 101 as a means for readily permitting the placing of a new roll of band material upon the reel, and I find that it is less difficult to load the reel when it is in a horizontal position than when in a vertical position. For this reason I mount the reel upon the pivot pin 93, permitting the reel and its hub to be swung from the vertical position shown in full lines in Fig. 5 to the dotted line position shown in that figure whenever it is desired to load the reel.

By referring particularly to Figs. 5 and 7, it will be observed that the hub 90 is provided with a nut 102 upon the exterior of the disc 86 which nut is keyed directly to the hub by means of a key 103. Hence when the reel is tipped to its horizontal position, as shown in Fig. 5, one flat side of the squared nut 102 will be presented to the flat surface of an upwardly extending finger 104 formed upon the supporting frame or standard 94, and will prevent any rotational movement of the hub 90 when the reel is in this horizontal position. Thus by swinging the reel to the horizontal position, the disc 86, with its spider, may be rotated relative to the reel to withdraw the pins 101 to permit ready loading, after which the disc 86 with its spider may be swung back in the opposite direction relative to the hub 90 to tightly engage and accurately center the new roll of band material which has been placed upon the reel. When the new roll of band material has been placed on the reel and the pin 101 swung outwardly to tighten the roll therein, the spider 88 and the hub 90 may be locked against further relative movement by means of a suitable knurled eccentric 102a rotatable about one of the pins 99, the knurled surface of which may engage the exterior of a flange 102b formed upon the nut 102, the knurled eccentric being held in this engaging position by means of a small spring 102c.

The disc 87 on the opposite side of the reel should be adjustable toward and away from the disc 86 to conform with various widths of rolled material, which may be placed upon the reel. For this purpose I have illustrated an extension 105 of the hub 90 over which a flange 106 formed upon the disc 87 may slide, the disc 87 being held tightly against the roll 107 of band material by means of a suitable hand nut 108 which may be threaded upon the extension 105.

When the reel is turned from its horizontal position to its vertical, or working, position, the alignment of the reel 28 may be adjusted by means of a set-screw 109 extending through the standard 94 and into engagement with an outwardly extending finger 110 formed upon the bearing block 92.

As was described in my copending application hereinbefore referred to, the material fed from the reel 28 to the feed rollers 29 and 30 passes first over an idler pulley 111 mounted upon a movable arm 112 pivoted as at 113 to the base 1 of the machine. The idler pulley 111 is normally urged to the full line position as shown in Fig. 1 by means of a spring 114 engaging an outwardly extending branch 115 of the arm 112 so that as the feed rollers 29 and 30 start to rotate to draw a length of material from the reel 28, the first movement of the material will cause the idler roller 111 to be drawn toward the center of the machine without actually starting the reel 28 into rotation. When the tension on the spring 114, however, builds up to a predetermined value, overcoming the inertia of the reel 28, the reel 28 will start to rotate, thus allowing material to feed from the reel in sufficient quantity to permit the idler roller 111 to return to its full line position. The amount of movement of the idler pulley 111 from one of its extreme positions to the other should be such as will be occasioned by the drawing of one complete length of strapping material used in one strapping operation of the machine and thus when the idler pulley 111 is returned to its outermost position the reel 28 should be stopped as otherwise an additional quantity of material will be unreeled therefrom, providing slack in the material and affording the possibility that the material may become tangled on the reel 28. I utilize the movement of the idler pulley 111 for the purpose of applying a brake to the reel to stop its movements as soon as the idler pulley has returned to its normal or extended position.

By referring particularly to Figs. 5 and 9, it will be noted that the shaft 113, on which the arm 112 is pivoted, is provided with a crank member 116 extending into the path of movement of the arm 112 through which crank member extends a brake-operating rod 117, the opposite end of the rod 117 being connected to a crank 118 secured to a stop shaft 119, which shaft has a secondary crank 120 extending therefrom and engaging a pin 121 in the lower end of a brake-operating lever 122. The brake-operating lever 122 is fulcrumed at 123 upon the standard 94 and is provided with a brake shoe 124 adapted to bear against the disc 86. When the idler pulley 111 is moved toward the center of the machine by the drawing of the band material into the machine, the movement of the arm 112 and its lug 116 will permit pressure to be relieved upon the brake shoe 124 allowing the reel 28 to rotate freely but as soon as the proper amount of material has been withdrawn from the reel and the idler pulley 111 has returned to its extended position, the brake shoe 124 will be reengaged with the disc 86 and will bring the reel to rest. A suitable spring 125 may be interposed between the end of the rod 117 and the lug 116 so as to form a yielding connection between these members.

The machine described herein operates as follows: With the machine parts in their normal rest positions as shown in Figs. 1 and 2, a length of strap has been fed from the reel 28 and across the table 3 until the free end of the strap lies in a position immediately in front of the nailing mechanism 26 (this strap feeding having occurred during the return movement of the drive bars 15 and 16 to their uppermost positions after the past previous operation of the machine). A box 7, with its cover 8 is drawn into the machine across the rollers 6 until the front end of the box engages the roller 40 on the box stop mechanism. The inertia of the moving box causes the roller 40 to be moved toward the right, as viewed in Fig. 1, to cause the rod 41 to engage the bellcrank 46, causing the switch operating rod 48 to be depressed, rocking shaft 38, and closing switch 35, to start the motor 31 into operation. The forward movement of the rod 41 is accompanied by a compression of the spring 40 so that as soon as the rear, or left-hand end of the box is moved past the rear stop 61, this stop will move up into engaging relation, behind the left-hand end of the box and thus hold the box in a fixed central position, with the center of the box and its cover aligned with the press shoe 11.

As the motor starts to rotate, it will rotate the cam disc 54 relative to roller 52 attached to the shaft 38, moving the roller 52 out of the notch 53 on the disc to prevent the return of the shaft 48 to its original rest positions, and thus maintaining the switch 36 closed until one complete rotation of the disc 54 has been accomplished.

As hereinbefore described, the initial rotation of the motor 31 will cause the drive bars 15 and 16 to be drawn downwardly, the first part of the downward movement of the drive bars releasing the nail driving mechanism 26 to start the nail into the free end of the strap and into the right-hand side of the box, as viewed in Fig. 2. Further downward movement of the drive bars 15 and 16 will bring the press shoe 11 into compressive relation with the cover of the box, compressing the center of the cover upon a line extending transversely of the cover and at about the same time the shaft 21 will be rotated by downwardly moving drive bars 15 and 16 to cause the feed rollers 29 and 30 to retract the strap, drawing it taut across the now compressed cover. Further downward movement of the drive bars 15 and 16 will cause the completed nail driving operations of the driving mechanisms 26 and 27, as was hereinbefore described, the nail driving mechanism 27 including a cutting device for cutting off the length of strap which has been attached to the box from the remainder of the strap supply. Further rotation of the motor 31 will cause the drive bars 15 and 16 to be re-elevated to their normal position, the upward movement of the drive bars being accompanied by a reverse rotation of the shaft 21 and a reverse operation of the strap feeding rollers 29 and 30 to feed a new length of strap into the strap guide 25 ready for the next box.

The final downward movement of the drive bar 15 will cause the roller 58, carried thereby, to engage the release pin 59 on the rod 41, thereby rotating the rod 41 to move the roller 40 out of its engaging relation with the end of the box 7, freeing the box ready for movement out of the machine. At this time, however, the box is held against movement by reason of the engagement of the press shoe 11 with the top of the box so that it is not until the drive bars start from their upward movement and release the press shoe 11 from the box that the upward movement of the box may start.

Also it will be observed that the downward movement of the drive bars 15 and 16, accompanied by the rotation of the shaft 21, will cause the box-ejector dog 62 to be retracted to a position engaging the left-hand end of the box, as viewed in Fig. 1, placing the ejector spring 67 under tension so that as soon as the roller 40 has been moved out of the way of the box and the box is released by the press shoe 11, the spring 67 will cause the box to be automatically ejected from the machine.

While I have shown the preferred embodiment of my invention herein, it is to be understood that I do not wish to be limited to any of the details of construction shown herein, except as defined in the appended claims.

I claim:

1. In a box-strapping machine, a box-supporting table for supporting a box while a strap is applied thereto, strap applying means associated with said table for securing a strap across a box on said table, power means for actuating said strap-applying means, a box-stop associated with said table for engaging one end of a box as said box is moved into strapping position on said table, and means operably responsive to the engagement of said box-stop by said box for actuating said power means to apply a strap to said box.

2. In a strapping machine, a box-supporting table for supporting a box in a position to be strapped, box-stop means associated with said table and normally extending into the path of movement over said supporting table, to stop said box in a predetermined position on said table, strap-applying means associated with said table for securing a strap across a box, power means for actuating said strap-applying means, means operably responsive to the engagement of said stop by the arrival of a box in said predetermined position for actuating said power means, and means actuated by said strap-applying means for moving said box-stop out of engagement with said box when said strap is applied to said box.

3. In a machine for applying straps to boxes, a box-supporting table on said machine for supporting a box in strapping position, box-ejecting means associated with said table including a dog, a spring normally urging said dog in the direction of movement of boxes across said table, strap-applying means for applying straps to boxes including reciprocating driving means therefor, means connecting said box-ejecting means with said driving means whereby movement of said driving means in one direction will draw said dog against the tension of said spring to a position engaging one end of a box on said nailing table, and movement of said driving means in the reverse direction frees said spring to eject said box.

4. In a machine for applying band straps to boxes from a continuous length of band material, a box-supporting table associated with said machine for supporting a box in strapping position thereon, means for feeding predetermined lengths of strap material from said supply including driving means therefor alternately operable in two directions, box-ejecting means for ejecting boxes from said table, including a dog and a spring normally urging said dog in the direction of movement of boxes across said table, and means connecting said driving means to said box-ejecting means whereby movement of said driving means in one direction will draw said dog against the force of its spring to a position to engage the end of a box and movement of said driving means in the opposite direction will free said spring to eject a box from said table.

5. In a box-strapping machine for applying straps to boxes, a reel for supporting a supply of strap material adjacent said machine, drawing means on said machine for unwinding predetermined lengths of strap material from said reel, and means on said machine and actuated by said strap applying means for applying a brake to said reel when a predetermined length of material has been unwound from said reel by said drawing means.

6. In a machine for applying straps to boxes, a reel for supporting a supply of strap material adjacent said machine, drawing means on said machine moving in one direction to unwind material from said reel to pass the same over a box to be strapped and operable in the reverse direction to draw said strap material taut upon said box, take-up means interposed between said reel and said drawing means for taking up the slack in said strap material upon reverse rotation of said drawing means, and means operably responsive to movement of said take-up means to take up said slack for applying a brake to said reel preventing further rotation thereof.

7. In a machine for applying straps to boxes, a reel for supporting a supply of strap material adjacent said machine, drawing means on said machine moving in one direction to unwind material from said reel to pass the same over a box to be strapped and operable in the reverse direction to draw said strap material taut upon said box, take-up means on said machine interposed between said reel and said drawing means, including a pulley over which said strap passes between said reel and said drawing means, means mounting said pulley for movement in one direction when said strap is drawn thereover by said drawing means, tension means for urging said pulley in the opposite direction upon reverse movement of said drawing means, brake means associated with said reel, and means operably responsive to the movement of said pulley in one diriection for releasing said brake and in the other direction for applying said brake.

HERBERT E. TWOMLEY.